United States Patent [19]

Snyder et al.

[11] Patent Number: 5,293,717
[45] Date of Patent: Mar. 15, 1994

[54] METHOD FOR REMOVAL OF ABRADABLE MATERIAL FROM GAS TURBINE ENGINE AIRSEALS

[75] Inventors: Kurt R. Snyder, Lebanon; Edward Marchitto, Vernon; Peter J. Draghi, Simsbury; Gordon M. Reed, Plantsville, all of Conn.

[73] Assignee: United Technologies Corporation, Hartford, Conn.

[21] Appl. No.: 920,936

[22] Filed: Jul. 28, 1992

[51] Int. Cl.⁵ .............................................. B24B 49/00
[52] U.S. Cl. ................... 51/165.71; 51/165.93; 51/290; 51/165.75
[58] Field of Search ............... 51/290, 165.93, 165.77, 51/165.71, 165.75; 901/41

[56] References Cited

U.S. PATENT DOCUMENTS

| | | | |
|---|---|---|---|
| 4,229,908 | 10/1980 | Panzeri | 51/165.93 |
| 4,512,107 | 4/1985 | Jones | 51/56 |
| 4,628,643 | 12/1986 | Gile et al. | 51/325 |
| 4,653,235 | 3/1987 | Farmer | 51/165.93 |
| 4,956,945 | 9/1990 | Oshima | 51/165.93 |
| 5,076,022 | 12/1991 | Ohta et al. | 51/165.71 |
| 5,095,662 | 3/1992 | Grimm et al. | 51/165.71 |

FOREIGN PATENT DOCUMENTS 2154163 9/1985 United Kingdom ............... 51/290

Primary Examiner—Robert A. Rose
Attorney, Agent, or Firm—Charles E. Sohl

[57] ABSTRACT

A method for removing a predetermined amount of material from the inner surface of a circular article which deviates from a true circular configuration. The outer surface of the article is touch probed to determine its true location in space, and the data are stored in a computer memory. These data are then compared to engineering design data to establish the location of the surface to which material removal is desired. A control computer compares the measured data with the design data, and sends commands to the machine control system, causing the machine to remove the excess material down to the desired dimension. Any deviations from circular are compensated for by moving the article radially relative to the cutting tool as the article moves circumferentially relative to the cutting tool.

13 Claims, 3 Drawing Sheets

METHOD FOR REMOVAL OF ABRADABLE MATERIAL FROM GAS TURBINE ENGINE AIRSEALS

TECHNICAL FIELD

This invention relates to the machining of circular objects and more specifically to the removal of abradable materials from the inner surfaces of gas turbine engine airseals.

BACKGROUND ART

The operation of a gas turbine engine involves compressing air in a series of airfoils mounted on disks which are alternately rotating and stationary, combining the compressed air with fuel in a combustion operation, and extracting power by expansion in a second series of airfoils mounted on disks which are alternately rotating and stationary.

In order to maximize efficiency and power output, it is necessary to reduce leakage of the compressed air and combustion products past the tips of the rotating airfoils. An airseal is typically formed by bonding a layer of abradable material to a circular support ring. An alternate method is to bond a honeycomb structure to the backup ring and pack abradable material in the cells of the honeycomb material.

At initial assembly of the engine, the inside diameter of the surface of the abradable material is less than the outside diameter of the tips of the airfoils attached to the rotating disks. During the initial operating period of the engine, the tips of the airfoils remove some of the abradable material from the inside surface of the airseal until the inside diameter of the airseal abradable material is virtually the same as the outside diameter of the rotating airfoils. This insures the least possible gap between the tips of the airfoils and the airseal, and minimizes leakage past the tips of the airfoils during engine operation.

After a designated period of service time, the engine is removed from service and the necessary overhaul and repair operations are performed to insure continued safe operation of the engine. During overhaul and repair, it is necessary to remove the old abradable material and replace it with new abradable material so that a new airfoil tip path may be formed in the airseal after reassembly of the engine.

At overhaul and repair, the airseals often deviate from a true circular configuration. This can be due to deviations from the nominal configuration in the original part or to distortion created by exposure to the elevated temperature conditions during engine operation. During overhaul and repair, the abradable material is typically removed from the support ring using conventional machining techniques. This includes fixturing the support ring in a manner so as to force the ring to a more nearly circular configuration, and rotating the ring about its center past a single point cutting tool which removes the abradable material. This technique generally involves extensive setup and machining time, as well as complex and expensive fixturing, and can still be inaccurate enough to either fail to completely remove the abradable material or to inadvertently cut into the support ring.

In U.S. Pat. No. 5,055,752 to Leistensnider et al and of common assignee with this application, a method is presented for machining the elongated edge of a workpiece to preselected dimensions and tolerances using a numerically controlled machining system. The surface of the workpiece along the length of the edge to be machined is probed to determine edge dimensions and/or the actual position and orientation of the edge at preselected locations. The data generated are stored and the edge of the workpiece is machined under the direction of a machine program which accesses the measured data, compares it with original design data for the part, and machines the elongated edge of the part in accordance with the original design configuration as adjusted for the measured data.

Since the conventional machining techniques are inherently inaccurate and the technique disclosed in Leistensnider et al is restricted to a workpiece which has an elongated edge, what is needed is a method to remove a layer of material from a circular object which is slightly out of round so as to leave a predetermined amount of material on the circular object. As applied to a gas turbine engine airseal, this amounts to removing the abradable seal materials completely without inadvertently removing any of the support rings which support the abradable seal materials.

SUMMARY OF THE INVENTION

The inner surface of a circular workpiece of known cross section is machined to preselected dimensions and tolerances using a numerically controlled machining system. Various surfaces of the workpiece are probed to determine the actual position of these surfaces relative to a cutting tool holder and to the workpiece fixture. The data gathered are stored in the memory of a computer. The inner surfaces of the circular workpiece are machined under the direction of a computer program which accesses the measured data and other known preselected part design data which have been stored, processes the data to modify a generic machine control program, and causes a cutting tool to follow the actual contour of the workpiece, thus removing material to preselected dimensions as the cutting tool and workpiece move relative to each other.

The method of the invention is particularly suited to the machining of many nominally identical parts but wherein the permitted tolerances from initial manufacturing steps or from in-service distortion result in significant part-to-part variations in the location and orientation (relative to known reference points on the part) of the portion of the part from which the material is to be removed. When such deviant parts are placed in a fixture in an automated machining system, the portion to be machined is located and oriented differently from part to part relative to fixture reference points used to locate the part in the fixture. The present invention uses a single machining program written for a particular part which is to be produced in quantity. A gas turbine engine airseal is used as an illustrative example. Each workpiece is fixtured into the machining apparatus and the outer surfaces of the workpiece are probed to generate data which are stored in a memory accessible to the machine program. Nominal engineering dimensions (e.g., from the engineering drawing) are also stored in the memory, which is part of the machine control. The machine program then compares the measured data with the nominal engineering dimensions to establish the true locations of the support surfaces for the abradable seal materials and controls the machining apparatus to move the airseal and cutting tool relative to each other in a manner which will remove only the abradable seal materials without cutting into the material of the support rings.

More particularly, in a multi-access closed loop numerically controlled machining system having a workpiece fixture and cutting tool spindle controllably movable relative to each other, the method of machining to remove abradable seal material from an airseal disposed within the fixture includes the steps of placing a measuring probe within the cutting tool spindle and probing points on the outer surface of the airseal to generate data indicative of the actual position of the airseal; storing such data; removing the probe from the spindle and replacing it with a cutting tool; and machining the inner surface of the airseal workpiece under the direction of a machine program which accesses the stored data and causes the cutting tool to follow along the actual bond surface for the abradable seal material, removing the abradable seal material as it travels relative to the airseal and causing the airseal to be continuously reoriented relative to the cutter as the airseal is moved in a circular manner about its centerline. By this technique, part-to-part variations in the actual position and orientation of the bond surface prior to machining are accommodated and the abradable seal material is automatically and efficiently removed without causing damage to the airseal support ring.

Thus a single machine program is used to machine a feature of a plurality of parts which are nominally the same per engineering design; but the location and orientation of the feature to be machined may vary significantly from part to part although within engineering design tolerances. The machine program includes selected nominal part dimensions. The probing generates specific data for each part to be machined, and stores the data. The nominal and specific part data are used in a machine program to calculate the correct position of the part relative to the cutter during machining of the specific part. Only part-specific data are changed as each new part is processed. The foregoing and other features and advantages of the present invention will become more apparent from the following description and accompanying drawings.

BEST MODE FOR CARRYING OUT THE INVENTION

Figure 1:
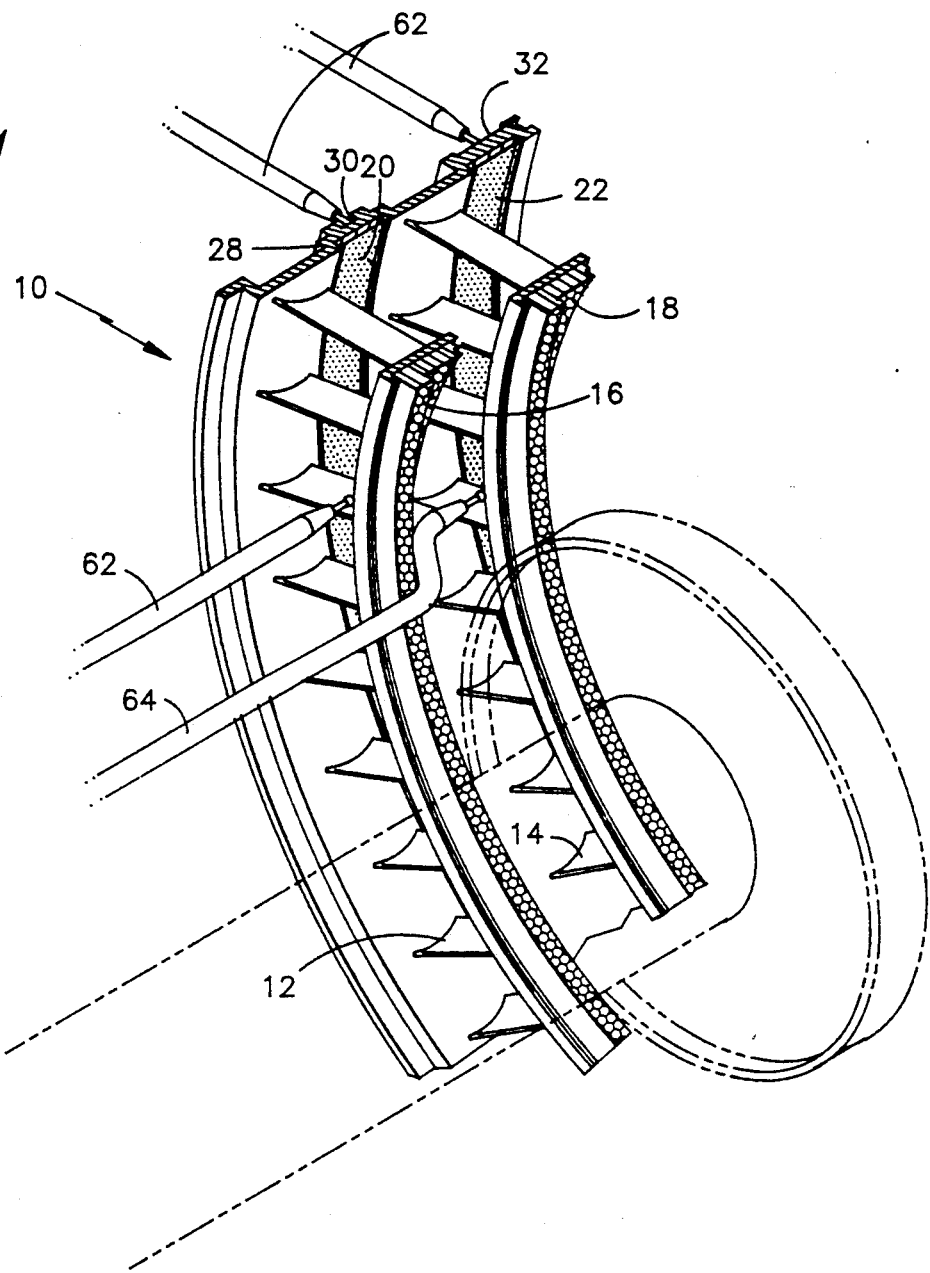
FIG. 1 is a perspective view of a portion of a gas turbine engine airseal.

A typical circular workpiece is shown in FIG. 1. The particular example shown to illustrate the principles of this invention is a compressor stator for a gas turbine engine. The stator 10 consists of two rings of vanes 12, 14 uniformly spaced around the inside circumference of the stator. The vanes guide the air as it flows through the engine. Honeycomb material 16, 18, which contains an abradable material in the individual cells of the honeycomb, is bonded on the inside diameter surfaces of the rings of vanes, and provides a medium in which knife-edge seals on a rotor (not shown) fit into self-cut grooves. This limits the amount of air which bypasses the stator as air flows through the compressor. Similarly, fiber metal abradable material 20, 22 is bonded to the inside diameter surfaces of the stator between the rings of vanes 12, 14. This material is abraded by the tips of the rotating blades (not shown) when the initial runs are made on the engine, producing a minimal gap which limits the amount of air flowing past the tips of the blades.

Both the honeycomb material 16, 18 and the fiber metal abradable material 20, 22 must be removed during the overhaul and repair operations so that new abradable material can be installed. Whatever out-of-roundness is present due to original manufacturing tolerances or distortion during use inhibits the use of conventionally controlled machining techniques to remove these abradable materials completely without inadvertently removing some of the support material.

Figure 2:
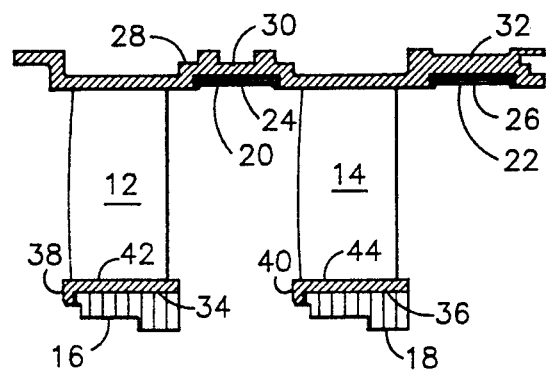
FIG. 2 is a cross-section of the gas turbine engine airseal of FIG. 1.

FIG. 2 provides additional detail of the locations of the abradable materials which must be removed. The fiber metal abradable materials 20, 22 must be removed down to the bond interfaces 24, 26 on the support ring 28. The distances between the bond interfaces 24, 26 and the outer surfaces 30, 32 of the support ring 28 are known, and are used to establish the true location of the interfaces. Similarly the honeycomb abradable materials 16, 18 must be removed down to the interfaces 34, 36 on the vane rings 12, 14. Again the distances between the bond interfaces 34, 36 and the outer surfaces 42, 44 of the shrouds 38, 40 are known, and are used to establish the true location of the interfaces.

Figure 3:
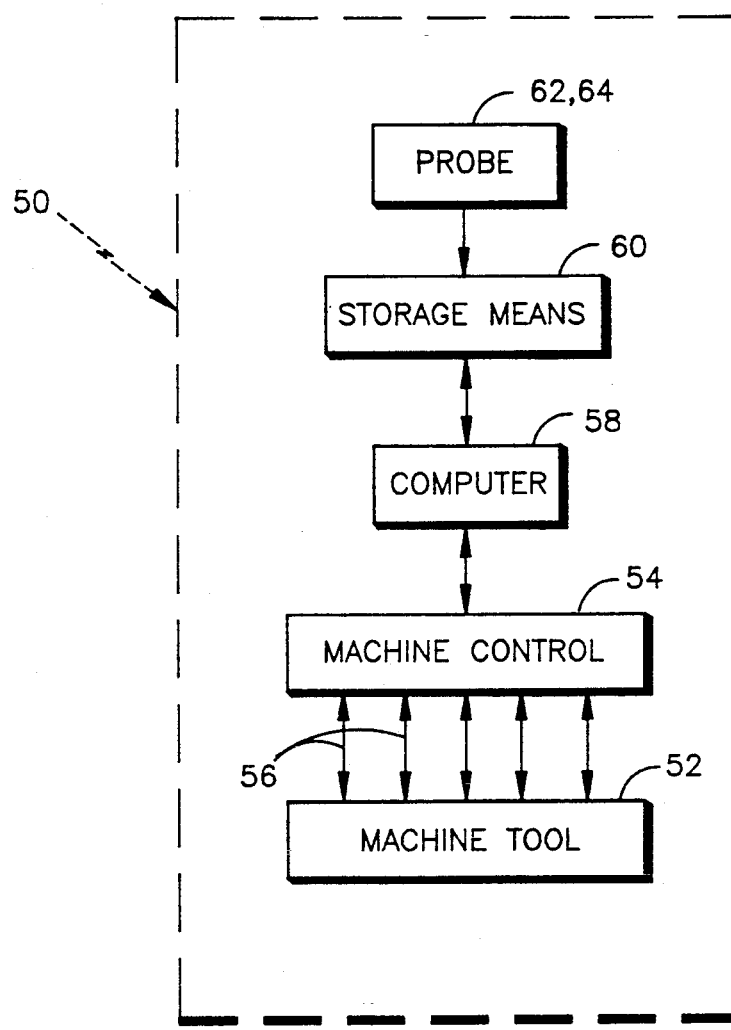
FIG. 3 is a block diagram illustrating the interrelationships between various portions of the machining system of the present invention.

Referring now to FIG. 3, a machining system 50 is depicted schematically as encompassing the machining hardware as well as the electronic hardware which controls the operation of the machining hardware. The box 52 represents the machining hardware and is labeled "machine tool." A machine control 54 sends a variety of signals 56 to the machine tool 52 to move and rotate the hardware in a particular manner. The system 50 also includes a computer 58, data storage means 60, and a probe 62 for sensing the location of various features of the workpiece. For discussion purposes, the computer and storage means are shown as separate from the machine control; however, they may also be considered part of the machine control.

The storage means 60 is simply a memory which is accessible by the computer 58. In the method of the present invention a computer program, which is also referred to herein as the machine program, is input into the storage means 60. The machine program includes certain preselected nominal engineering design dimensions of the part to be machined. Further, each time the probe 62 touches a point on the workpiece (e.g., the stator 10), data indicative of the machine tool position at that instant is placed in the storage means.

During operation the computer accesses the machine program and selected data in the storage means, performs certain calculations on the stored data, and either sends newly calculated data to the storage means for later use or sends instructions to the machine control 54 which operates the machine tool 52 according to those instructions.

Prior to actual machining of the workpiece the machine program instructs the machine tool 52 to move the probe and fixture such that the probe contacts the workpiece on the appropriate surfaces, such as the surfaces 30, 32, 42, 44 in FIG. 2. The data thus sent to the storage means 60 as a result of those probe contacts are accessed and used by the computer 58 to calculate the deviations of the position of the workpiece from the nominal design location. These deviations are stored in the storage means 60 for use in the subsequent step of machining of the workpiece.

Figure 4:
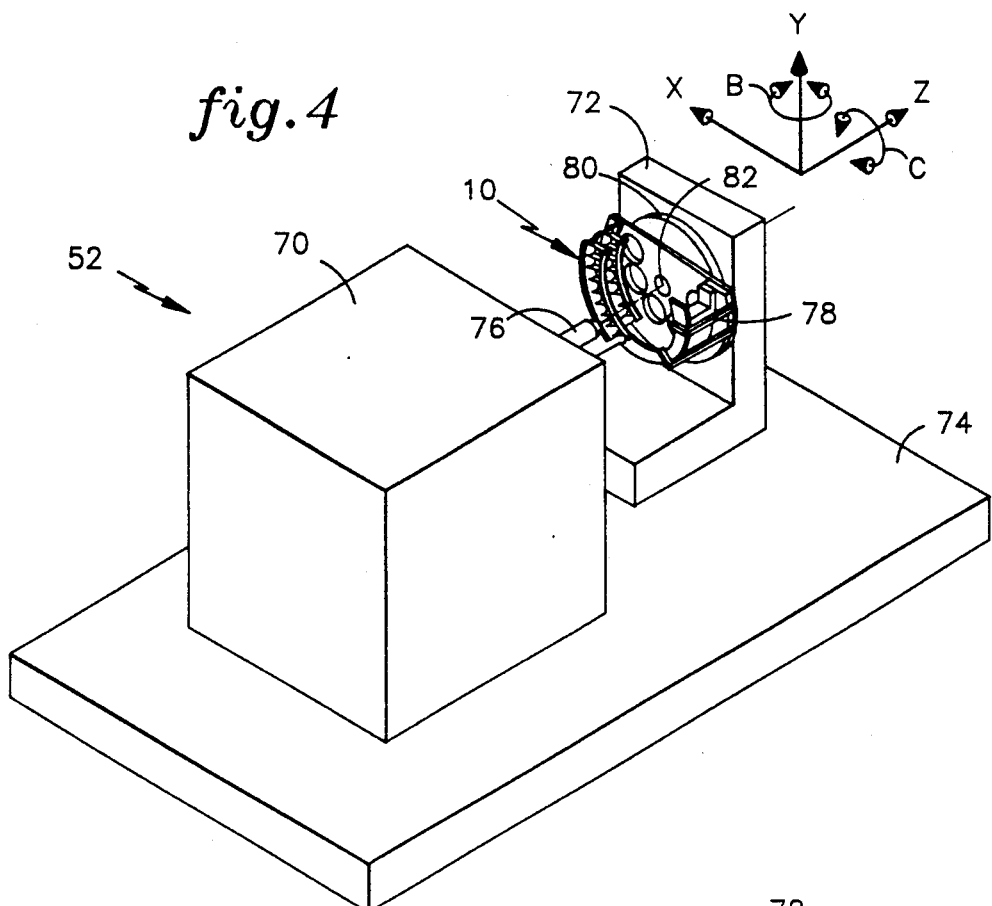
FIG. 4 is a perspective view of a numerically controlled machine center used for machining of circular objects.

Referring now to FIG. 4, the machine tool 52, used for removal of the abradable materials in this particular example, consists of a numerically controlled horizontal machining center 70 and a movable work table 72 mounted on a base 74. The spindle 76 of the machining center moves in the Y and Z directions, while the work table 72 moves in the X direction and rotates about the Y and Z axes, shown as B and C rotations in FIG. 4. The stator 10 is fastened to an attachment fixture 78 which is mounted on a rotating plate 80 on the work table 72. The stator has its axis 82 parallel to the axis of the spindle 76.

Figure 5:
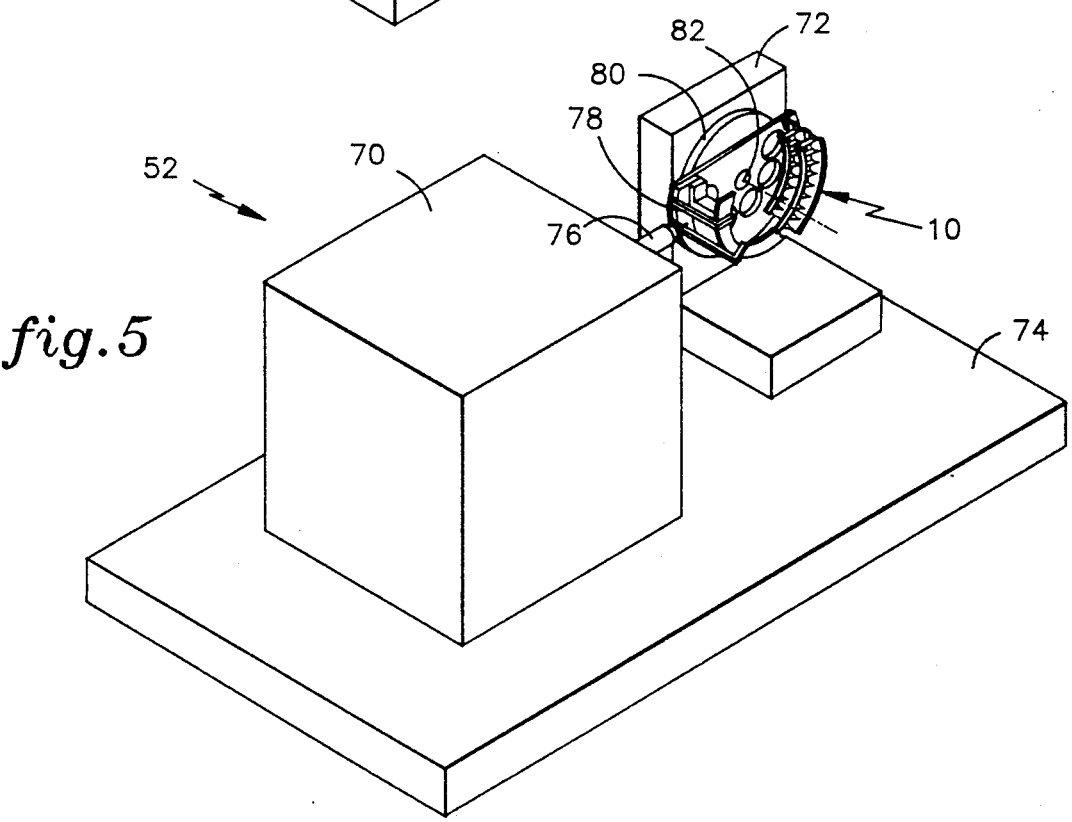
FIG. 5 is a perspective view of the numerically controlled machine center of FIG. 4 with the movable work table oriented for dimensional probing.

For the determination of the location of the surfaces 30, 32, the movable work table 72 is rotated 90° about the Y-axis, as shown in FIG. 5, so that the stator 10 is positioned with its axis 82 perpendicular to the axis of the machining center spindle 76. The probe 62, as shown in FIG. 1, is inserted in the spindle 76. The stator 10 is then rotated about its axis 82 by rotating the fixture 78, and the stator is contacted with the probe 62 in a plurality of locations around the circumference of the stator, thus providing the location of the outer surfaces 30, 32. These data points are then stored in the memory of the computer. It should be noted that the distance between the outer surface being probed and the bond surface can vary due to various patterns on the workpiece, e.g., bosses, strengthening ribs and pockets where material is removed for weight reduction. Information regarding these varying distances is included in the nominal engineering design data stored in the data storage means 60.

To machine the fiber metal abradable 20, 22 from the stator, the work table 72 is returned to the position where the axis 82 of the stator is parallel to the axis of the spindle 76, as shown in FIG. 4. The probe 62 is removed from the spindle 76 and replaced with a machining tool. In the present example, the machining tool chosen is a superabrasive machining wheel (shown in FIG. 1 in phantom), although other cutting tools, e.g., single point cutters, would also be applicable to this invention.

The machining operation will be described for the removal of the metal fiber abradable material 20; removal of the metal fiber abradable material 22 would be performed in a similar manner. The machining operation is conducted by extending the spindle 76 in the Z-direction until the cutting tool is positioned adjacent to the fiber metal abradable material 20. With the spindle 76 rotating, the work table 72 is translated in the X-direction until the cutting tool comes into contact with the abradable material, and begins to remove the abradable material. When the work table 72 has moved to a position where the outer diameter of the cutting tool is coincident with the interface 24, the attachment fixture 78 begins to rotate so that the stator 10 is rotated about its axis 82 and the abradable material 20 is removed.

As the stator 10 is rotated about its axis 82, the work table 72 is moved back and forth in the X-direction in accordance with instructions from the control computer such that the outer diameter of the cutting tool remains coincident with the interface 24. In this manner, the fiber metal abradable material 20 is removed completely without removing any material from the support ring 28.

For the determination of the location of the interfaces 34, 36, the work table 72 is oriented as shown in FIG. 4. A straight contact probe 62 is inserted in the spindle 76, and the machining fixture is moved in the X-direction until contact is made with the probe. This is done at a plurality of points between the individual vanes around the circumference of the stator, thus providing the location of the surface 42. The data points thus generated are stored in the memory of the computer.

An offset probe 64 is then substituted for the straight probe 62 in order to gain access to the surface 44, which is inaccessible with the straight probe 62, due the interposition of the vane ring 12 between the spindle 76 and the vane ring 14. Measurements are then made in a manner similar to that described above to provide data regarding the location of the surface 44. These data points are also stored in the memory of the computer.

The removal of the honeycomb abradable material 16 is performed in a manner similar to that described above for the fiber metal abradable material. The probe 62 is removed from the spindle 76 and replaced with the machining tool, in this case a superabrasive machining wheel. The spindle 76 is extended in the Z-direction until the cutting tool is aligned with the honeycomb abradable material 16. With the spindle 76 rotating, the work table 72 is translated in the X-direction until the cutting tool comes into contact with the abradable, and begins to remove the abradable. When the work table 72 has moved to a position where the outer diameter of the cutting tool is coincident with the interface 34, the attachment fixture 78 begins to rotate so that the stator 10 is rotated about its axis 82 and the honeycomb abradable material 16 is removed.

As the stator 10 is rotated about its axis 82, the work table 72 is moved back and forth in the X-direction in accordance with instructions from the control computer such that the outer diameter of the cutting tool remains coincident with the interface 34, 36. In this manner, the honeycomb abradable material 16 is removed completely without removing any material from the shrouds 38.

The removal of the abradable material 18 is performed in a similar manner. In this case the offset probe 64 is used to gain access to the surface 44 which is inaccessible with the straight probe 62.

It should be understood that the invention is not limited to the particular embodiments shown and described herein, but that various changes and modifications may be made without departing from the spirit and scope of this novel concept as defined by the following claims.

We claim:

1. A method for machining the inside surface of a circular workpiece utilizing a numerically controlled machining system, comprising the steps of:
   (a) positioning the workpiece in a fixture means of the system;
   (b) positioning a probe in a holder which is part of the system and moveable relative to the fixture means;
   (c) moving, under the direction of a machine program, the holder and fixture means relative to each other to cause the probe to contact a plurality of points on the outer surface of the workpiece to be machined, and generating by such contacts data indicative of the position of such contacted points relative to the fixture means;

(d) storing in a memory of the system such contacted point position data;

(e) storing in the memory of the system preselected data indicative of desired after machining dimensions of the workpiece;

(f) removing the probe from and positioning a cutting tool in the holder; and (g) machining the inner surface of the workpiece under the direction of a machine program which accesses the stored data and cause the cutting tool to follow the inner surface of the workpiece, removing material from the inner surface to preselected dimensions as the tool travels relative thereto, the fixture means and holder being reoriented relative to each other as the workpiece moves past the cutting tool to maintain the workpiece in appropriate positioned relation to the cutting tool over the entire circumference of the workpiece.

2. A method as recited in claim 1 wherein said cutting tool is a single point cutting tool.

3. A method as recited in claim 1 wherein said cutting tool is a superabrasive machining wheel.

4. A method as recited in claim 1 wherein said airseal has a non-uniform thickness in the circumferential direction.

5. A method as in claim 1 wherein said circular workpiece is a gas turbine engine airseal.

6. A method for machining a gas turbine engine airseal to remove abradable seal material from an internal surface using a numerically controlled machining system, the workpiece having a center line, said system comprising:

(a) machining apparatus including a moveable work table, fixture means for holding an airseal workpiece, said fixture means being secured to said work table, spindle means for holding, alternately, a cutting tool and a probe, said spindle means having a spindle axis, and being moveable relative to said fixture means;

(b) programmable machine control means adapted to control relative movement between the fixture means and the spindle means and including data storage means and computer means;

said method comprising the steps of:

(1) fixing an airseal workpiece having a center axis within the fixture means such that the location and orientation of the center axis of the workpiece relative to the fixture means is known within predetermined tolerances and parallel to the axis of the spindle, and the location, relative to the fixture means, of at least one point on the workpiece not on the center line is known within predetermined tolerances;

(2) entering into the data storage means desired engineering design dimensions to which the workpiece is to be machined;

(3) placing the probe in the tool holding means and probing therewith preselected points on the outer surface of the airseal workpiece at each of a preselected number of spaced apart locations along the circumference of the workpiece, the step of probing causing data to be stored in the data storage means indicative of the actual position of each point probed relative to the fixture means;

(4) removing the probe from the spindle means and replacing it with the cutting tool; and (5) machining the inner surface of the airseal workpiece by machine control under the direction of a computer program which accesses the data in said storage means, and uses that data to generate instructions to the machine control which, in turn, causes the cutting tool to be brought into position at an initial one of said probed locations along the inner surface of the workpiece, and to accurately follow along that surface, cutting the surface to a desired shape as the workpiece travels relative to the cutting tool, the workpiece and the cutting tool being reoriented relative to each other as the workpiece moves past the cutting tool to maintain the workpiece axis and the cutting tool axis in appropriate positional relation over the circumference of the workpiece.

7. A method as recited in claim 6 wherein said airseal is of a one-piece, circular configuration.

8. A method as recited in claim 6 wherein said airseal consists of a series of arcuate segments.

9. A method as recited in claim 6 wherein said airseal has a non-uniform thickness in the circumferential direction.

10. A method as recited in claim 6 wherein said airseal has a non-uniform thickness in the radial direction.

11. A method as recited in claim 6 wherein said cutting tool is a single point cutting tool.

12. A method as recited in claim 6 wherein said cutting tool is a superabrasive machining wheel rotating about the spindle axis.

13. A method as recited in claim 5 wherein said airseal has a non-uniform thickness in the radial direction.

* * * * *